Figure 1:
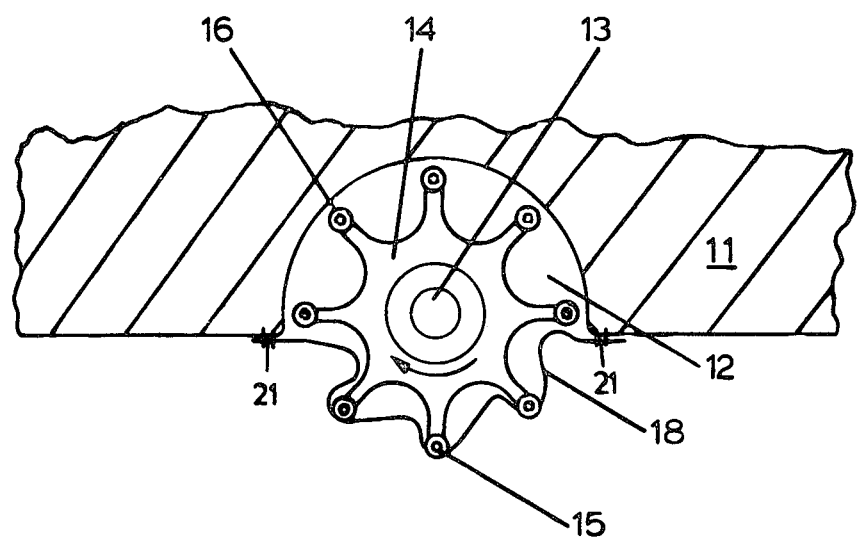

United States Patent [19]
Riddle

[11] 3,884,176
[45] May 20, 1975

[54] PROPULSIVE FORCE GENERATING MEANS FOR MARINE VEHICLES

[75] Inventor: Lavis Albert Henry Riddle, East Cowes, England

[73] Assignee: British Hovercraft Corporation Limited, Yeovil, England

[22] Filed: June 25, 1974

[21] Appl. No.: 483,079

[30] Foreign Application Priority Data
June 25, 1973 United Kingdom............... 30017/73

[52] U.S. Cl..................................... 115/49; 416/66
[51] Int. Cl............................................. B63h 1/04
[58] Field of Search........... 115/.5 R, 1 R, 1 A, 1 B, 115/3–5, 23, 49, 53, 54; 416/66, 81, 132, 24; 417/474, 476, 477; 180/7, 119, 120, 122

[56] References Cited
UNITED STATES PATENTS
2,794,400  6/1957  Bodine, Jr............................ 417/479
3,637,324  1/1972  Sipin................................... 115/1 R Primary Examiner—Duane A. Reger
Assistant Examiner—Jesus D. Sotelo
Attorney, Agent, or Firm—Larson, Taylor and Hinds

[57] ABSTRACT

A propulsive force generating device is provided for marine vehicles consisting of parallel rollers rotating within a space on the underside of the vehicle and a sheet of flexible material of suitable length across the space.

In operation the sheet is immersed in the water and dynamic pressure forces the sheet into the gaps between the rollers which forms convolutions which, during the rotation of the rollers, causes a succession of ripples which engage with the water to produce a propulsive force.

5 Claims, 2 Drawing Figures

PROPULSIVE FORCE GENERATING MEANS FOR MARINE VEHICLES

This invention is concerned with propulsive force generating means for marine vehicles.

The term "marine vehicles" is intended to cover vehicles which operate on or in close proximity to the surface of water, examples being ships and air cushion vehicles.

Propulsion devices are known in which a pneumatically inflated flexible roller is rotated in proximity to a water surface over which it travels. Such a roller has a rigid internal framework arranged so that when hydrodynamic forces operating on the flexible surface of the roller exceed those created by inflation pressure, the flexible surface of the roller is indented to form propulsion blades. Problems arise when a roller of this type is revolved to produce a propulsion force. Firstly, the centrifugal force produced by the rotation urges that part of the flexible surface not subjected to hydrodynamic forces to fly outwards, and secondly, out of balance rotary forces are generated by the rotary path of the flexible surface being at varying distances from the axis of the roller.

The present invention provides in or for a marine vehicle propulsion force generating means including a plurality of longitudinally extending parallel rollers evenly spaced from and around a common axis and in operation of the device being arranged to rotate around the common axis so as to prescribe a path of movement which is partly within a space formed in the underside of a vehicle to which the device is attached, a sheet of flexible impermeable material arranged for attachment on the underside of the vehicle so as to extend across the space and having a longer length between lines of attachment on the underside of the vehicle than the length of that part of the path of movement of the rollers which is external of the space in the underside of the vehicle, and means arranged for co-operation with each end of the device and with the vehicle for preventing entry of water to the interior of the device.

Figure 2:
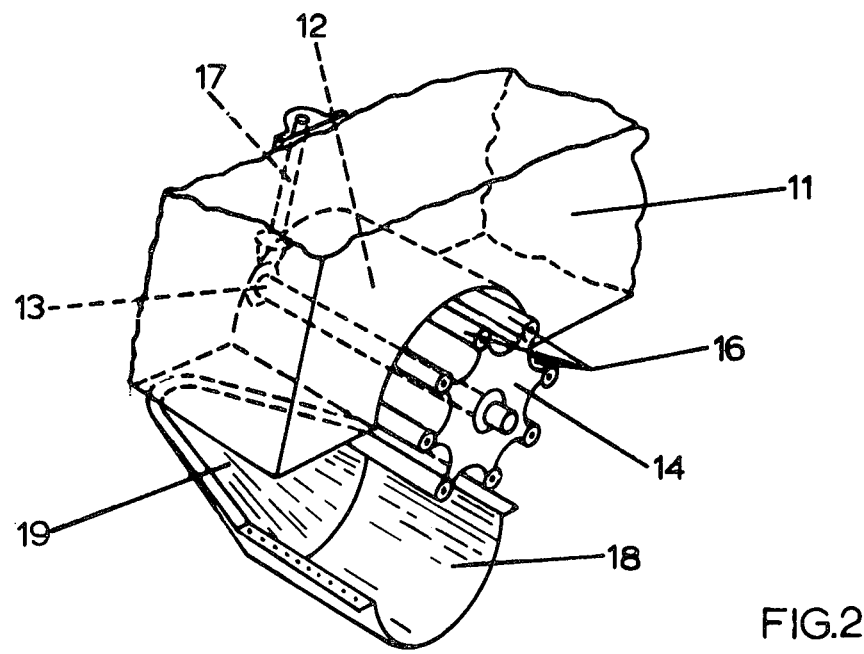

One embodiment of the invention will now be described, by way of example only, with reference to the accompanying drawings, in which:

FIG. 1 is a schematic side elevation of a propulsive force generating device according to the invention, and FIG. 2 is an exploded perspective view of the device illustrated in FIG. 1.

The underside structure 11 of a marine vehicle (not shown) is constructed so as to have an arcuate space 12 within which is a drive shaft 13 carrying in the proximity of each end a star wheel 14 arranged to rotate with the drive shaft 13. Corresponding arms on each star wheel 14 are interconnected by axles 15, and carried by and running on these axles 15 are rollers 16. The rollers 16 are of a length so that they occupy the space between the star wheels 14 and have sufficient clearance both between the star wheels 14 and on the axles 15 to turn freely.

The drive shaft 13 is arranged to be driven through a transmission system 17 by a prime mover (not shown). The drive shaft 13 rotates the star wheels 14 and thereby cause the axles 15 carrying the rollers 16 to be rotated around the drive shaft axis and to prescribed a path of movement which is partly within and partly external of the space 12.

A sheet of flexible impermeable material 18 is arranged for attachment to the underside structure 11 along lines of attachment 20 and 21. The sheet 18 extends across the space 12 and has a longer length between the lines of attachment 20 and 21 than the length of that part of the path of movement of the rollers 16 which is external of the space 12. Preferably the length of the sheet 18 between the lines of attachment 20 and 21 is within a range 1.3 to 1.7 times the length of the path of movement prescribed by each roller 16 external of the space 12.

The sheet 18 is bounded on its free ends by conical fairings 19 of flexible impermeable material which serve to prevent the entry of water into the space bounded in part by the underside structure 11 and in part by the sheet 18 without limiting the flexibility of the sheet 18.

In operation of the device, when the marine vehicle is operating on or in close proximity to a water surface, so that the sheet of flexible material 18 is immersed in water, the dynamic water pressure forces the sheet 18 into the gaps between the rollers 16 so that the sheet 18 has a plurality of convolutions, each convolution conforming to a roller 16. When the drive shaft is driven by a prime mover to turn the star wheels the rollers are rotated around the drive shaft and that part of their path of movement which takes place external of the vehicle structure causes the convolutions to move across the sheet as a succession of ripples or blades which engage the water to produce a propulsive force. The direction of the propulsive force is dependent on the direction of rotation of the rollers.

The device may be used either singly or as a multiple of units to provide propulsion for ships or air cushion vehicles. When used as multiple units one or more units may be located in each wall of a rigid sidewall type of air cushion vehicle. Alternatively, one or more units may be installed on the underside of a ship at the hull centerline to provide forward or reverse propulsion, or they may be positioned on the forward part of a ship with the axis of rotation of the device parallel with the longitudinal axis of the ship to act as a transverse propulsion unit.

I claim as my invention:

1. In or for a marine vehicle, propulsive force generating means including a plurality of longitudinally extending parallel rollers evenly spaced from and around a common axis and in operation of the device being arranged to rotate around the common axis so as to prescribe a path of movement which is partly within a space formed in the underside of a vehicle to which the device is attached, a sheet of flexible impermeable material arranged for attachment on the underside of the vehicle so as to extend across the space and having a longer length between lines of attachment on the underside of the vehicle than the length of that part of the path of movement of the rollers which is external of the space in the underside of the vehicle, and means arranged for co-operation with each end of the device and with the vehicle for preventing entry of water to the interior of the device.

2. Propulsive force generating means as claimed in claim 1, wherein the rollers are carried on axles extending between and supported by arms of suitably spaced star wheels.

3. Propulsive force generating means as claimed in claim 2, wherein a shaft extends through the centres of the star wheels and is arranged so that when driven it rotates the star wheels.

4. Propulsive force generating means as claimed in claim 1, wherein the sheet of flexible impermeable material has a length between lines of attachment which is within a range 1.3 to 1.7 times the length of that path of the path of movement prescribed by each roller external of the space.

5. Propulsive force generating means as claimed in claim 1, wherein the means at each end of the device for preventing entry of water comprises a conical fairing of flexible impermeable material arranged for cooperation with the end of the device and with the vehicle.

* * * * *